United States Patent [19]

Davies et al.

[11] Patent Number: 5,391,597
[45] Date of Patent: Feb. 21, 1995

[54] COMPOSITION AND PROCESS FOR INCREASING THE SHEAR STRENGTH OF PROCESSING WASTES USED FOR TIP BUILDING AND UNDERGROUND CONSOLIDATION

[75] Inventors: Michael C. R. Davies, Cardiff; Keith P. Williams, Caerphilly, both of United Kingdom; Peter J. Strydom, Morristown, N.J.; Alexander S. Lambert, Johannesburg, South Africa

[73] Assignee: Cytec Technology Corp., Wilmington, Del.

[21] Appl. No.: 132,061

[22] Filed: Oct. 4, 1993

[51] Int. Cl.⁶ .................. C08K 3/00; C09K 17/00; E02D 3/12
[52] U.S. Cl. .................................. 524/2; 524/5; 405/264; 405/266
[58] Field of Search ............ 524/2, 5; 523/131; 405/264, 266

[56] References Cited

U.S. PATENT DOCUMENTS

| | | | |
|---|---|---|---|
| 4,092,467 | 5/1978 | Welcher et al. | 526/80 |
| 4,137,164 | 1/1979 | Coscia et al. | 210/54 |
| 4,316,505 | 2/1982 | Lammiman et al. | 166/293 |
| 4,690,971 | 9/1987 | Flesher et al. | 524/555 |
| 4,997,759 | 3/1991 | Cibulskas et al. | 435/219 |
| 5,141,365 | 8/1992 | Smart | 405/267 |

FOREIGN PATENT DOCUMENTS

| | | | |
|---|---|---|---|
| 0388108 | 9/1990 | European Pat. Off. | B09B 3/00 |
| 73-013673 | 1/1973 | Japan | C02C 3/00 |
| 50-082857 | 7/1975 | Japan | B01D 0/00 |
| 52-090111 | 7/1977 | Japan | E02D 3/12 |
| 61-212399 | 9/1986 | Japan | C02F 11/00 |
| 62-089789 | 4/1987 | Japan | C09K 7/02 |
| 1139198 | 5/1988 | Japan | C02F 11/00 |
| 1254292 | 10/1988 | Japan | C02F 1/52 |
| 2200440 | 8/1988 | United Kingdom | F26B 5/16 |
| 1285105 | 1/1987 | U.S.S.R. | E01C 7/18 |

*Primary Examiner*—Paul R. Michel
*Assistant Examiner*—LaVonda R. DeWitt
*Attorney, Agent, or Firm*—Frank M. Van Riet

[57] ABSTRACT

There are provided compositions and processes for enhancing the initial and long term shear strength and initial tip stability of process wastes. The process wastes are aqueous dispersions such as the slurry tailings from mining operations. The compositions are comprised of the process waste, cement and a water absorbent polymer which is a mixture of Mannich acrylamide polymers and dimethyldiallyammonium halide polymers.

12 Claims, 2 Drawing Sheets

(B/C 1:3)(%)
—■—0.00%
—▲—0.03%
—●—0.30%

FIRST 4 HOURS (B/B 1:3)(%)
- ■ — 0.00%
- ▲ — 0.03%
- ● — 0.30%

FIRST 4 HOURS

% SOLID/%CEM./%m
(B/C 1:3)
- ○ — 40/6/0.0
- ● — 40/6/0.1
- ▲ — 40/6/0.5
- □ — 40/6/1.0

FIRST 6 HOURS

COMPOSITION AND PROCESS FOR INCREASING THE SHEAR STRENGTH OF PROCESSING WASTES USED FOR TIP BUILDING AND UNDERGROUND CONSOLIDATION

FIELD OF THE INVENTION

The present invention relates to compositions and processes for increasing the shear strength of process wastes such as the tailings from mining activities used for tip building and underground consolidation. The compositions are comprised of an aqueous dispersion of the process waste solids, cement and a water absorbent polymer. The preferred water absorbent polymer is a mixture of Mannich acrylamide polymers and dimethyldiallylammonium halide polymers.

BACKGROUND OF THE INVENTION

Mining activity is often associated with the production of large amounts of extremely fine waste material in the form of aqueous slurry tailings. Disposal of these tailings has traditionally been to lagoons or, after dewatering, to surface heaps. Increasing environmental consideration has focused attention on disposal methods. One possible method proposed for disposing of these tailings is to use them as underground backfill for support purposes. This method requires classification and cementation in order to achieve the necessary shear strength and compression characteristics.

The addition of water absorbent polymers to mining products and process wastes for the purpose of drying the products and process wastes is known in the art, as demonstrated by United Kingdom Patent Application No. 2,200,440A and U.S. Pat. No. 4,690,971. The dried product or waste that results from the addition of a water absorbent polymer, such as, for example, crosslinked sodium polyacrylate, and the like, is brittle or in a crumbly state.

The use of water absorbent polymers with red mud wastes from a Bayer process is discussed in European Patent Application No. 0,388,108. The Application teaches the blending of a water absorbent polymer to the process waste of a Bayer process. The process waste is an aqueous liquid with dispersed solid particles. The mixture of the waste and polymer has the characteristic of easily being pumped and then becoming rigid upon standing.

The use of water absorbent polymers in aqueous dispersions from various industrial processes is also well known in the art.

Japanese Patent No. 61-212,399 discloses a composition consisting of cement, promoter and sulphates or chlorides of aluminum and iron to solidify high water content organic and inorganic waste. The composition is prepared by adding below 30 parts by weight promoter to 100 parts by weight cement. The pH is then adjusted by adding at least one sulphate or chloride of aluminum or iron in an amount below 800 parts by weight. The promoter is prepared by adding under 20 parts by weight of cement to cement mortar consisting of 100 parts by weight cement and 200 parts by weight standard sand. To prevent separation of the water and waste, water absorbent material such as polyacrylate, hydroxyethyl cellulose, methyl cellulose or bentonite, is added. The citation also teaches the addition of rust inhibitors such as an alkali salt or alkaline earth salt and the addition of water insoluble alkaline earth compounds such as sand, soil, aggregate or stone powders to the composition. The composition results in a gel with high viscosity or a hardened substance within at least three (3) hours.

Japanese Patent Application No. 1,254,292 discloses the aggregation of suspended material in water by adding a hydraulic inorganic solidifying agent and an inorganic or organic flocculant to the water. The flocculant used is $Al_2(SO_4)_3$, $AlCl_3$, sodium alginate, polyaluminum chloride, polyacrylamide, sodium polyacrylate, aminopolyacrylate or diamine diamide. The hydraulic inorganic solidifying agent is Portland cement or an aluminum cement. The solidifying agent is mixed with the flocculant in a weight ratio of 1:1–1:5. The mixture is added to the water to be treated in an amount of 5–20% based on the weight of the suspended solid.

Japanese Patent Application No. 1,139,198 discloses the reformation of earth and sand from a construction site by adding slag formed in the purification of water or sludge from the treatment process of industrial waste water, a water soluble polymer and a hydroxide, chloride, sulphate or nitrate of a cation of over two (2) valances and or hydraulic cement. The cation with over two (2) valencies is preferably an element of groups IIA, IIB, IIIA, IIIB, IVB, VB, VIB or VIIB. The hydraulic cement can be Portland cement, alumina cement, special cement, or their mixtures with fly ash or pozzolan. The water soluble polymer can be guar gum, starch, alginate, polyvinyl alcohol, polyvinyl pyrrolidone, polyethylene oxide polyacrylate, polysaccharide or isobutylene-maleic anhydride copolymer. The polymer is added to the composition in an amount of 0.5–8 kg when the water content of the composition is 20–50%.

Soviet Union Patent Application No. 1,285,105 teaches a composition for road and runway construction which comprises 6–8 weight percent cement, 81–86 weight percent soil, 6–8 weight percent waste products from polyacrylate article production and 5–10 weight percent vat residue from vinyl chloride production.

Japanese Patent Application No. 52-090,111 discloses a method for consolidating soil comprising silt and fine sand by injecting the soil with a coagulating solution prior to treating the soil with grout. The coagulating solution can be $Al_2(SO_4)_3$, $NaAlO_2$, $FeSO_4$, sodium salt of carboxy methylcellulose (CMC), polyacrylate, polyethyleneamine, tertiary ammonium salts, polyvinylpridines or polyacryiamides.

Japanese Patent Application No. 50-082,857 discloses a process for treating cement containing waste water which comprises adding polyacrylate and polyacrylamide to the waste water to coagulate the suspended materials. High-degree of polymerization sodium polyacrylate and nonionic polyacrylamide in a weight ratio of 1:0.5–1 are the preferred polyacrylate and polyacrylamides.

Japanese Patent No. 73-013,673 discloses a process for treating sludge from sewage and industrial processes. The process consists of filtering off or concentrating the sludge to remove water, adding greater than 3% by weight of a water hardenable cement and greater than 30 weight percent of an inorganic sulphate of sodium, iron, aluminum or ammonium. The sludge is dehydrated or concentrated by adding 15–40 weight percent $Ca(OH)_2$ as a filtration assistant and 0.05–0.2 weight percent of a water soluble organic polymer such as polyacrylamide and sodium polyacrylate.

Japanese Patent Application No. 62-089,789 discloses a process for regenerating deteriorated or cement contaminated mud. The process consists of adding a sodium salt of carboxymethylcellulose (CMC) with a degree of polymerization lower than 350.

These prior art teachings fail to suggest a composition and process for obtaining a composition that results in improved initial and long term shear strength, reduced fine loss, increased water retention, increased cement retention and reduced requirement for desliming, which eventually becomes a coherent solid.

SUMMARY OF THE INVENTION

To this end, an object of the present invention is to provide a process waste composition with improved initial and long term shear strength, reduced fine loss, increased water retention, increased cement retention and reduced requirement for desliming, which eventually becomes a coherent solid.

A further object of this invention is to provide a process waste composition that has increased initial tip stability and slime that does not require a separate retaining structure.

Another object of the present invention is to provide a process for producing a composition with improved initial and long term shear strength, reduced fine loss, increased water retention, increased cement retention and reduced requirement for desliming, which eventually becomes a coherent solid.

A further object of the present invention is to provide a process for obtaining a composition that has increased initial tip stability and slime that does not require a separate retaining structure.

Applicants have found that by adding cement and a judiciously-selected water absorbent polymer to aqueous process waste, the initial and long term shear strength of the process waste and the initial tip stability of the process waste can be increased. The applicants have also found that the process waste/cement/water absorbent polymer composition reduces the requirement for desliming.

The process waste can be any type of aqueous waste with fine solids dispersed in it, such as the aqueous slurry tailings from mining operations, e.g., coal, gold or phosphate mining and processing operations.

It is critical to the present invention to select and use as the water absorbent polymer a mixture of Mannich acrylamide polymers and dimethyidiallylammonium halide polymers. As will be seen this particular water soluble polymer has a unique ability to rapidly rigidify the composition by imparting a high initial shear strength.

BRIEF DESCRIPTION OF THE DRAWINGS

The drawings graphically represent the physical properties and testing results of compositions and processes of the present invention and compare them with those of the prior art.

DETAILED DESCRIPTION OF THE INVENTION

Figure 1:
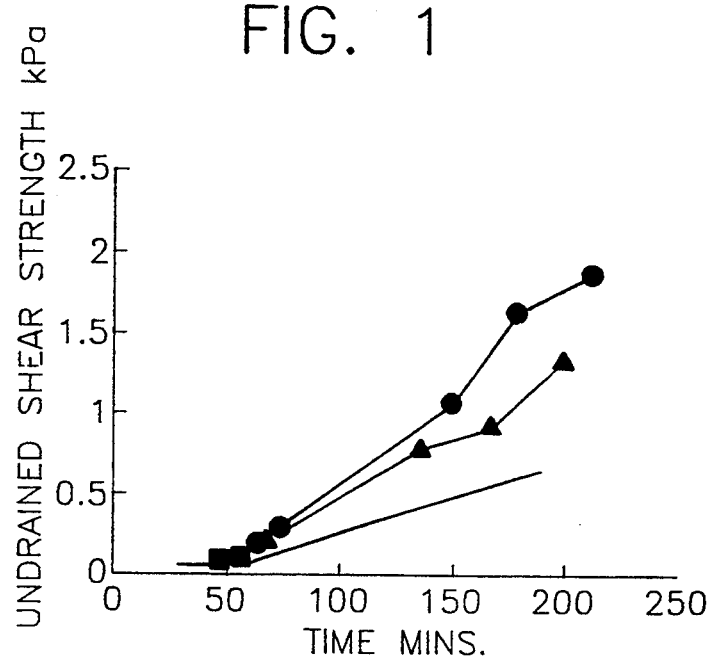
FIG. 1 is a graph showing that two compositions of this invention containing mixed polymers develop higher and more rapid shear strength in cemented coal tailings than does one without the mixed polymers.

As used in this application, improved initial and long term shear strengths, reduced fine loss, increased water retention, increased cement retention and reduced requirement for desliming is in reference to the physical properties for process waste compositions and process waste/cement compositions which are generally known in the art.

This invention relates to a composition for increasing the shear strength of processing wastes used for tip building and underground stowing. The composition is comprised of process waste, cement and a water absorbent polymer comprising a mixture of Mannich acrylamide polymer and a dimethyldiallylammonium halide polymer.

The process wastes used in the invention can be any type of aqueous waste with fine solid particles dispersed throughout the liquid phase. The preferred process wastes are the slurry tailings from mining and mine processing activities, such as coal, gold or phosphate tailings. The process waste generally has a solids content in the range of about 10 to about 50 parts by weight, preferably about 20 to about 40 parts, solid particles per 100 parts by weight of the dispersion. The most preferred process wastes have about 35 to about 40 parts, by weight, of solid particles.

The cement, as used in the present invention, stabilizes and increases the coherent strength of the composition. The cement can be any type of commercially available cement such as Portland cement. The final composition contains an effective amount which can comprise generally anywhere from about 1 to about 10 parts, by weight, per 100 parts, by weight, of process waste, cement and polymer, with the preferred range being from about 2 to about 7 parts, by weight, with the most preferred range being about 3 to about 6 parts, by weight.

The water absorbent polymer can be any type of mixture of the Mannich acrylamide polymer and a dimethyldiallylammonium halide polymer. They are described in U.S. Pat. No. 4,997,759. The effective concentration of the polymer is from about 0.01 to about 1.5 parts, by weight, per 100 parts, by weight, of process waste, cement and polymer combined, with the preferred range being from about 0.03 to 1.0 parts, by weight, and the most preferred amount being about 0.5 parts, by weight.

The uniquely suitable polymer is a mixture of a Mannich acrylamide polymer and a dimethyldiallylammonium halide polymer. Some of them are commercially available, e.g., those sold under the trademark AQUASTORE ® water absorbent polymers by American Cyanamid Company. The preferred mixtures are composed of the two polymers in a ratio of 3:1 to 1:30, by weight, real polymer solids, respectively, preferably 1:1.5 to 1:7, same basis, respectively.

The Mannich acrylamide polymers are generally well known in the art, examples thereof being disclosed in U.S. Pat. No. 4,137,164, hereby incorporated herein by reference. Generally, these polymers are homopolymers of acrylamide or copolymers thereof with such comonomers as acrylonitrile, methacrylamide, acrylic acid etc. in amounts up to about 50%, preferably 5–50% of the resultant copolymer. The polymers have molecular weights ranging from about 10,000 to about 3,000,000 and are chemically modified to provide dimethylaminomethyl groups to the extent that the polymer contains 25–100 mol percent of these groups, preferably at least 40 mol percent.

The preferred Mannich polyacrylamide polymers are Mannich polyacrylamide of at least 70% aminomethylation with a Brookfield viscosity in the range of 26,000 to 46,000 cps.

The dimethyldiallylammonium halide (DADM) polymers are likewise known in the art, examples thereof being disclosed in U.S. Pat. No. 4,092,467, hereby incorporated herein by reference. These polymers are homopolymers of DADM or copolymers thereof with such monomers as acrylamide, vinyl pyrrolidone, etc. in amounts up to about 20% of the resultant polymer. These polymers have intrinsic viscosities ranging from about 0.1–4.00, preferably 2.0–3.5, deciliters per gram. The halide can be chloride, fluoride, bromide or iodide.

The preferred dimethyldiallylammonium halide polymer is polydimethyldiallylammonium chloride, with an intrinsic viscosity between 2.0–3.5 cps.

The polymer mixture may be added to the composition as a blend or as individual components. If added as individual components, they should be added as near the same time as possible.

DESCRIPTION OF THE PREFERRED EMBODIMENTS

The invention will be further defined by means of the following examples. Products A and B are set forth in the following tables, with respect to the amounts employed, as 0.065% aqueous polymer solutions while Product C is expressed as a 20.0% aqueous polymer solution.

In the following examples, the Mannich acrylamide polymers employed are each Mannich polyacrylamides of 70% aminomethylation and are further designated as follows:

| Product | Percent Solids | Brookfield Viscosity, cps |
|---------|---------------|---------------------------|
| A | 5.9–6.4 | 26,000–34,000 |
| B | 5.5–6.1 | 34,000–46,000 |

The polymer of dimethyidiallylammonium chloride is further designated as follows:

| Product | Percent Solids | Intrinsic Viscosity, dl/g |
|---------|---------------|---------------------------|
| C | 19.5–20.5 | 2.0–3.5 |

In the examples, polymer mixtures designated A/C and B/C refer to those specified. The weight ratios of A/C and B/C, unless otherwise specified are 1:3.

The undrained shear strength of cemented coal tailings is determined using a laboratory shear vane apparatus. The principle of the apparatus is that a vane is inserted into the specimen and rotated at a constant rate, and the peak torque required to rotate the vane is measured using a calibrated spring. The rotation of the vane at a constant rate eliminates any discrepancy between samples due to rate effects.

The undrained shear strength (Cu) of the process waste composition is a function of the torque required to shear the composition and the dimensions of the vane.

$$Cu = \frac{T}{\pi d_2(h/2 + d/6)}$$

The dimensions of the four-bladed vane used in this investigation are h = 12.6 mm and diameter d = 12.8 mm. Hence, the undrained shear strength is given by $$Cu = \frac{T}{4.34 \times 10^{-6}}$$

Specimens are prepared which produce a slurry of approximately 2 liters. Dried tailings materials are generally used to enable reproducible mixtures to be obtained. All preparations of the slurry are conducted using a commercially available "Hobart" mixer, with care being taken to ensure that at each stage the length of mixing time is the same for each batch of slurry.

EXAMPLES 1 AND 2 AND COMPARATIVE EXAMPLE 1A

Example 1

An aqueous coal tailings composition containing approximately 40 parts by weight coal tailings solids (dried at 40° C. prior to reconstituting in tap water) is prepared in a Hobart mixer. Approximately 3 parts by weight of cement are added to the composition and continuously mixed for five minutes. Approximately 0.03 part by weight of a mixture comprising, on a solids basis, 1 part by weight of a Mannich polyacrylamide of 70 mol % aminomethylation (34,000–46,000 cps, Brookfield viscosity) and 3 parts by weight of polydimethyldiallylammonium chloride (intrinsic viscosity 2.0–3.5 dl/g), (B/C=1:3), is added to the coal tailings and cement mixture. All parts are based on 100 parts by weight of the three component composition. The resulting composition is continuously mixed for another five minutes to produce a curable composition in accordance with the present invention.

Following mixing, the slurry is placed in a 200 ml capacity plastic cup for vane testing. The undrained shear strength for the mixture is determined according to the procedure outlined above and the results presented graphically at various times. It is seen that within about 150 minutes a shear strength of about 2.3 kPa is reached. After seven days, the undrained shear strength reaches about 14 kPa.

Example 2

An aqueous composition containing approximately 40 parts by weight of reconstituted coal tailings solids, 3 parts by weight of cement and 0.3 part by weight of the same polymer mixture (B/C=1:3) is prepared according to the procedure used to prepare Example 1. This produces a curable composition in accordance with the present invention. The undrained shear strength is determined for the composition and, within 150 minutes, reaches 3.2 kPa. After seven days the undrained shear strength reaches about 14 kPa. After twenty-eight days, the undrained shear strength has further risen to about 28 kPa.

Comparative Example 1A

An aqueous composition containing approximately 40 parts weight of reconstituted coal tailings solids and 3 parts by weight of cement is prepared according to the procedure used to prepare Example 1. No polymer mixture is added. The undrained shear strength is determined for the composition and, within the first 100 minutes, reaches only 2 kPa. The undrained shear strength after seven days is about 9 kPa and after twenty-eight days is about 24 kPa. This shows that the mixed polymers enhance shear strength.

EXAMPLES 3 AND 4 AND COMPARATIVE EXAMPLE 3A

Comparative Example 3A

An aqueous composition containing approximately 38.4 parts by weight of coal tailings solids and 3 parts by weight cement is prepared according to the procedure used to prepare Example 1, except that the coal tailings solids are originally added to the mixer in a slurry form, i.e., not reconstituted. This produces a curable composition not in accordance with this invention because it does not contain the mixed polymers.

Example 3

An aqueous composition containing approximately 38.4 parts by weight of coal tailings solids, 3 parts by weight of cement and 0.03 part by weight of mixed polymers (B/C=1:3) is prepared according to the procedure used to prepare Comparative Example 3A. This produces a curable composition in accordance with the present invention.

Example 4

An aqueous composition containing approximately 38.4 parts by weight of coal tailings solids, 3 parts by weight of cement and 0.3 part by weight of mixed polymers (B/C=1:3) is prepared according to the procedure used to prepare Comparative Example 3A. This produces also a curable composition in accordance with the present invention.

The undrained shear strengths for Examples 3, 4 and Comparative Example 3A are determined according to the procedure outlined for Example 1. The results are graphically reported in FIG. 1. It can be seen that increasing the water absorbent mixed polymer (B/C=1:3) concentration produces increased vane shear strength. For example, at times of less than four hours, a mixed polymers concentration of 0.3 part by weight, Example 4, increases the strength of the composition with cement alone, Comparative Example 3A, by a factor of at least 2.

EXAMPLES 5, 6 AND 7 AND COMPARATIVE EXAMPLE 5A

Comparative Example 5A

An aqueous composition containing approximately 40 parts by weight of gold tailings solids and 3 parts by weight of cement is prepared according to the procedure used to prepare Example 1. This produces a curable composition not in accordance with the present invention because it does not contain the mixed polymers.

Example 5

An aqueous composition containing approximately 40 parts by weight of gold tailings solids, 3 parts by weight of cement and 0.1 part-by weight of mixed polymers (B/C=1:3) is prepared according to the procedure used to prepare Example 1. This produces a curable composition in accordance with the present invention.

Example 6

An aqueous composition containing approximately 40 parts by weight of gold tailings solids, 3 parts by weight of cement and 0.5 part by weight of mixed polymers (B/C=1:3) is prepared according to the procedure used to prepare Example 1. This produces a curable composition in accordance with the present invention.

Example 7

An aqueous composition containing approximately 40 parts by weight of gold tailings solids, 3 parts by weight of cement and 1.0 part by weight of mixed polymers (B/C=1:3) is prepared according to the procedure used to prepare Example 1. This produces a curable composition in accordance with the present invention.

The shear strengths for Examples 5, 6, and 7 and Comparative Example 5A are determined according to the procedure outlined for Example 1. The results show that in the first 6 hours, the strength of Comparative Example 5A is 1.8 kPa, for Example 5 it is 1.9 kPa, for Example 6 it is 2.9 kPa and for Example 7 it is 3.0 kPa.

EXAMPLES 8, 9 AND 10 AND COMPARATIVE EXAMPLE 8A

Comparative Example 8A

An aqueous composition containing approximately 40 parts by weight of gold tailings solids and 6 parts by weight of cement is prepared according to the procedure used to prepare Example 1. This produces a curable composition not in accordance with the present invention because it does not contain the mixed polymers.

Example 8

An aqueous composition containing approximately 40 parts by weight of gold tailings solids, 6 parts by weight of cement and 0.1 part by weight of mixed polymers (B/C=1:3) is prepared according to the procedure used to prepare Example 1. This produces a curable composition in accordance with the present invention.

Example 9

An aqueous composition containing approximately 40 parts by weight of gold tailings solids, 6 parts by weight of cement and 0.5 part by weight of mixed polymers (B/C=1:3) is prepared according to the procedure used to prepare Example 1. This produces a curable composition in accordance with the present invention.

Example 10

An aqueous composition containing approximately 40 parts by weight of gold tailings solids, 6 parts by weight of cement and 1.0 part by weight of mixed polymers (B/C=1:3) is prepared according to the procedure used to prepare Example 1. This produces a composition in accordance with the present invention.

Figure 2:
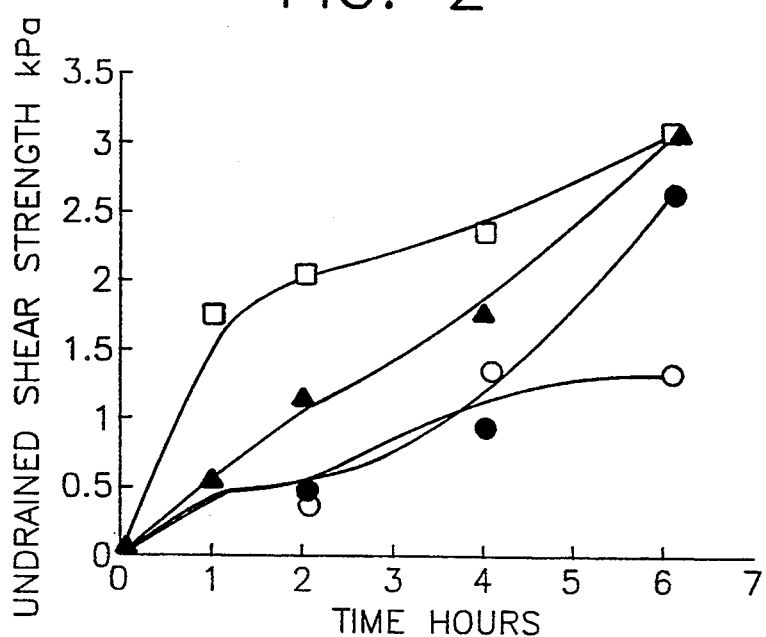
FIG 2., like FIG. 1 is a graph showing that two compositions of this invention containing mixed polymers develop higher and more rapid shear strength in cemented gold tailings than does one without the mixed polymers.

The undrained shear strengths for Samples 8, 9 and 10 and Comparative Example 8A are determined according to the procedure outlined in Example 1. The results are graphically reported in FIG. 2. This shows that in all cases, the mixed polymers enhance the achievement and magnitude of the shear strengths.

Examples 5A-10 develop undrained shear strengths beyond the range that can be measured using a standard laboratory shear vane. Therefore, the strength of these tailings at 7 and 28 days is obtained in unconfined triaxial compression tests.

The unconfined triaxial compression tests are conducted using specimens nominally 63.5 mm high and 31.73 mm in diameter. A proving ring provides measurement of axial force and a dial gauge the axial deformation.

All 7 and 28 day tests on Examples 5A-10 are conducted at a constant rate of axial deformation of 0.095 mm/min, i.e. an axial strain rate of 0.150%/min., resulting in failure typically being achieved in about twenty minutes.

The results of Examples 5A-10 show that the addition of mixed polymers (B/C=1:3) to gold tailings results in a systematic increase in shear strength at the early stages of mixing. For longer times after mixing the shear strengths of Examples 5A-10 are increased with mixed polymer content up to approximately 0.5 part by weight per 100 parts by weight of the total composition.

Comparing the shear strengths of the 3 parts (Examples 5-7) and 6 parts by weight (Examples 8-10) cement compositions at the early stages latter mixing, it should be noted that the values of shear strength are very similar. The applicants do not want to be limited to any particular theory but it is believed that this comparison indicates that the water absorbent polymer rather than cement is responsible for the increase in shear strength gains. The higher concentration of cement results in a greater shear strength at longer times after mixing, as the effect of the cement becomes more pronounced. For both the 3 parts by weight and and the 6 parts by weight cement concentrations, the 28 day strength with 0.5 part by weight of mixed polymers, Examples 6 and 9, is twice that of the cemented tailings alone, Examples 5A and 8A.

EXAMPLES 11 AND 12 AND COMPARATIVE EXAMPLE 11A

Comparative Example 11A

An aqueous composition is prepared according to the procedure used to prepare Example 1. The composition contains 40 parts by weight of gold tailings solids, from the same source used in Examples 5-7, and 3-6 parts by weight of cement. This produces a curable composition not in accordance with the present invention because it does not contain the mixed polymers.

Example 11

An aqueous composition is prepared according to the procedure used to prepare Example 1. The composition contains 40 parts by weight of gold tailings solids from the same source used in Examples 5-7, 3-6 parts by weight of cement and 0.5 part by weight of mixed polymers (B/C=1:3). This produces a composition in accordance with the present invention.

Example 12

An aqueous composition is prepared according to the procedure used to prepare Example 1. The composition contains 40 parts by weight of gold tailings solids from the same source used in Examples 5-7, 3-6 parts by weight of cement and 1.0 part by weight of mixed polymers (B/C=1:3). This produces a curable composition in accordance with the present invention.

The compressibility of Examples 11 and 12 and Comparative Example 11A is measured to determine 1) the quantity of liquid which drains from the sample during three (3) days of curing and 2) the axial strain resulting from the application of one dimensional compressive stress of 1 MPa.

The quantity of liquid which drains is measured prior to the application of the compressive stress, by a device designed and fabricated at the University of Wales College of Cardiff. The device consists of an aluminum cylinder, 300 mm high and 70 mm internal diameter, into which is placed the sample compositions to a nominal depth of 100 mm. A porous plastic disc is placed above the sample and a porous stone is placed below the sample to permit drainage. Both the porous disc and stone have a nominal diameter of 70 mm. A drainage hole is located at the base of the cylinder to which is attached a calibrated burette, enabling water which flows out of the base of the specimen to be collected. Loading to the specimen is applied via a loading cap, which is drilled with holes to permit drainage to the top of the specimen during the loading stage of the test. The force is provided by a 150 mm internal diameter pneumatic actuator. During loading, the compression of the tailings is monitored using an electrical linear strain displacement transducer (LSDT). This is fixed to the piston of the cylinder with the measuring rod resting on top of the cylinder.

Prior to testing, the device is prepared by ensuring that the pipe leading to the burette and the porous stone are free of air bubbles and the interior of the cylinder lubricated with silicon oil to minimize friction developing between the specimen and the walls.

The sample is then introduced to the cylinder, its depth recorded and the porous plastic disc inserted. The specimen is then left to allow the cement to cure for three (3) days during which the quantity of water leaving the specimen is monitored. Throughout this period, the level of the burette is maintained at its initial level to sustain constant boundary conditions.

Figure 3:
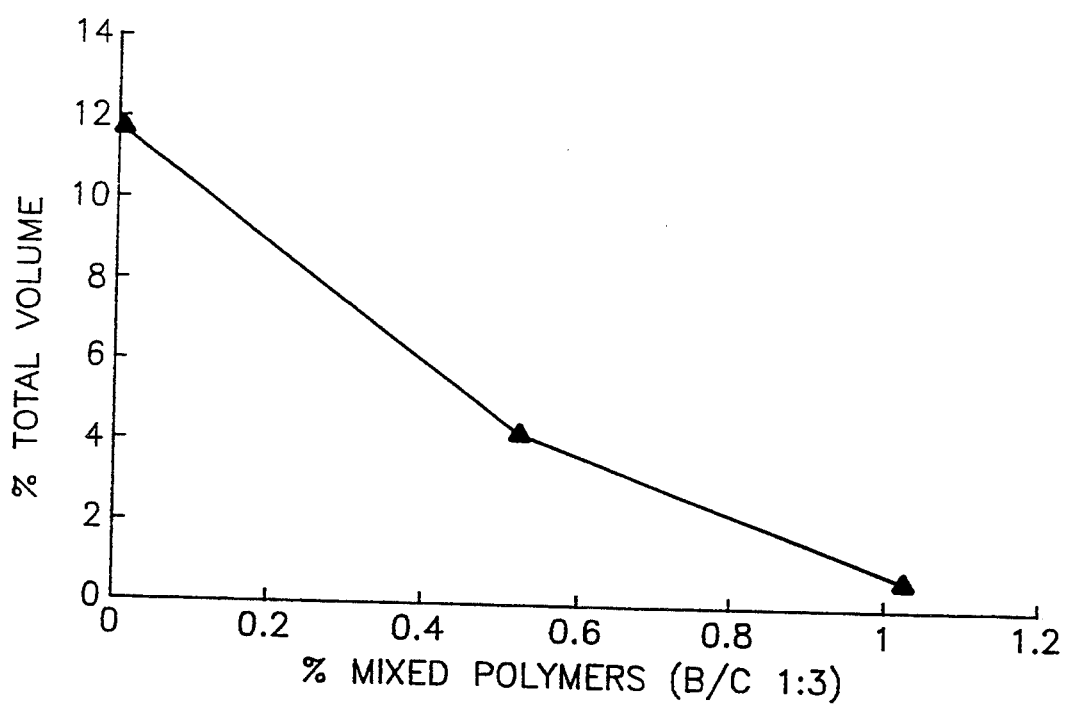
FIG. 3 is a graph showing that the addition of mixed polymers in accordance with this invention to cemented gold tailings vastly reduces the amount of water drained therefrom during compression, the decrease being related to the concentration of polymers.

The amount of water which drains from Examples 11, 12 and Comparative Example 11A during the first portion of the compressibility test is reported graphically in FIG. 3. This graph shows that, as the mixed polymer (B/C=1:3) concentration is increased from 0 to 1 part by weight, the volume of water which drains decreases from 12.2% to 0.6%. This is significant because it shows that water will not exude and gather at inconvenient and dangerous locations.

The second phase of the compressibility tests on Examples 11 and 12 and Comparative Example 11A entail application of compressive stress. The loading cap is introduced to the cylinder and the piston of the actuator extended and attached to the top cap by means of a screw thread. Zero readings are taken on the LSDT and the required load, 1 MPa applied by rapidly raising the air pressure in the cylinder to 218 kPa (determined from the ratio of the internal diameter of the cylinder to the actuator, viz. 0.22). This pressure is maintained throughout the second phase of the test. Monitoring of the compression of the specimen takes place for 24 hours, although typically consolidation of the specimen is normally completed about 10 hours after the application of the loading increment.

The consolidation plots indicate that the vast majority of the consolidation occurs within the first two (2)

minutes for all the samples tested. The plots for Example 11 and Comparative Example 11A are almost coincidental, while the plot for Example 12 indicates approximately twice the axial (one-dimensional) strain. This is significant because it indicates greater coherency at the higher level of mixed polymers.

The final volumetric strains show that, at a mixed polymer (B/C=1:3) concentration of 0 and 0.5 part by weight, the volumetric strain is approximately 11%, while at a mixed polymer concentration of 1.0 part by weight, the volumetric strain is 25%. The significance of this is that it indicates greater coherency at the higher level of mixed polymers.

During the process of curing and compression of Examples 11, 12 and Comparative Example 11A in the compressibility tests under the one-dimensional stress of 1 MPa, Example 11, containing 0.5 part by weight of mixed polymers concentration is found to be most preferred in terms of total volume change, the upper and lower levels of mixed polymers having higher changes.

All patents, publications and test methods, if any, referred to are hereby incorporated by reference.

Many variations of the present invention will suggest themselves to those skilled in the art in light of the above-detailed description. For example, instead of polymer mixture B/C=1:3, the following polymer mixtures can be used; B/C=1.3:1; A/C=3:1; A/C=1:3; A/C=1:30; B/C=1:30. All such obvious modifications are within the full intended scope of the claims.

We claim:

1. A curable composition for tip building and underground stowing having enhanced initial shear strength, comprising:
   (a) process waste comprising an aqueous dispersion comprising 10 to 50 parts by weight of solid particles per 100 parts by weight of said dispersion;
   (b) an effective amount of cement; and
   (c) an effective amount of a water absorbent polymer comprising a mixture of Mannich acrylamide polymer and a dimethyldiallyl-ammonium halide polymer.

2. A composition as defined in claim 1, wherein the process waste comprises slurry tailings from mining activities.

3. A composition as defined in claim 1, wherein the process waste is an aqueous dispersion comprising 20 to 40 parts by weight of solids.

4. A composition as defined in claim 1, wherein the concentration of the cement is 2 to 7 parts by weight per 100 parts by weight of (a), (b) and (c).

5. A composition as defined in claim 1, wherein the concentration of the water absorbent polymer is from about 0.01 to about 1.5 parts by weight per 100 parts by weight of (a), (b) and (c).

6. A composition as defined in claim 1, wherein the ratio of Mannich acrylamide polymer to dimethyldiallylammonium halide polymer is 3:1 to 1:30.

7. A method for converting aqueous dispersions of process wastes to a form adapted to tip building and to underground stowing, said method comprising:
   (A) forming a mixture comprising
       (a) process waste comprising an aqueous dispersion comprising 10 to 50 parts by weight of solid particles per 100 parts by weight of said dispersion;
       (b) an effective amount of cement; and
       (c) an effective amount of a water absorbent polymer comprising a mixture of Mannich acrylamide polymer and a dimethyldiallyl-ammonium halide polymer; and
   (B) allowing said mixture to react and form a mass.

8. A method as defined in claim 7, wherein the process waste comprises slurry tailings from mining activities.

9. A method as defined in claim 7, wherein the process waste is an aqueous dispersion comprising 20 to 40 parts by weight of solids.

10. A method as defined in claim 7, wherein the concentration of the cement is 2 to 7 parts by weight per 100 parts by weight of (a), (b) and (c).

11. A method as defined in claim 7, wherein the concentration of the water absorbent polymer is from about 0.01 to about 1.5 parts by weight per 100 parts by weight of (a), (b) and (c).

12. A process as defined in claim 7, wherein the ratio of Mannich acrylamide polymer to dimethyldiallylammonium halide polymer is 3:1 to 1:30.

* * * * *